US008741991B2

(12) United States Patent
Yamamoto et al.

(10) Patent No.: US 8,741,991 B2
(45) Date of Patent: Jun. 3, 2014

(54) FIBER-REINFORCED POLYAMIDE[5,10] MOLDING COMPOUNDS

(75) Inventors: Motonori Yamamoto, Mannheim (DE); Weol Kyu Jeong, Gunsan (KR); Arnold Schneller, Seeheim-Jugenheim (DE); Matthias Scheibitz, Weinheim (DE); Freddy Gruber, Offenbach (DE); Jürgen Deininger, Oftersheim (DE)

(73) Assignee: BASF SE, Ludwigshafen (DE)

( * ) Notice: Subject to any disclaimer, the term of this patent is extended or adjusted under 35 U.S.C. 154(b) by 567 days.

(21) Appl. No.: 12/865,469

(22) PCT Filed: Jan. 29, 2009

(86) PCT No.: PCT/EP2009/051008
§ 371 (c)(1),
(2), (4) Date: Jul. 30, 2010

(87) PCT Pub. No.: WO2009/095441
PCT Pub. Date: Aug. 6, 2009

(65) Prior Publication Data
US 2010/0331461 A1 Dec. 30, 2010

(30) Foreign Application Priority Data
Jan. 31, 2008 (EP) .................................... 08101120

(51) Int. Cl.
C08K 5/34 (2006.01)
C08K 5/48 (2006.01)
C08K 5/3492 (2006.01)
C08K 5/16 (2006.01)
C08K 3/32 (2006.01)

(52) U.S. Cl.
USPC ............... 524/88; 524/90; 524/101; 524/186; 524/358; 524/414; 524/420; 524/431; 524/606; 977/742

(58) Field of Classification Search
USPC ............ 524/88, 90, 101, 186, 358, 414, 420, 524/431, 606; 977/742
See application file for complete search history.

(56) References Cited

U.S. PATENT DOCUMENTS

| | | | | |
|---|---|---|---|---|
| 2,130,948 A | * | 9/1938 | Carothers | .................... 15/159.1 |
| 2,217,515 A | | 10/1940 | Houpt | |
| 4,314,927 A | * | 2/1982 | Theysohn et al. | ............. 524/100 |
| 4,537,949 A | | 8/1985 | Schmidt et al. | |
| 4,540,772 A | | 9/1985 | Pipper et al. | |
| 4,663,230 A | | 5/1987 | Tennent | |
| 5,013,786 A | | 5/1991 | Payne et al. | |
| 5,270,353 A | * | 12/1993 | Nakano et al. | ................ 523/214 |
| 6,844,061 B2 | | 1/2005 | Morita et al. | |
| 2005/0003497 A1 | | 1/2005 | Nishi et al. | |
| 2006/0197246 A1 | * | 9/2006 | Hale et al. | ..................... 264/37.3 |
| 2010/0292429 A1 | * | 11/2010 | Volkert et al. | ................... 528/44 |

FOREIGN PATENT DOCUMENTS

| | | |
|---|---|---|
| EP | 129195 | 12/1984 |
| EP | 129196 | 12/1984 |
| EP | 205556 | 12/1986 |
| EP | 270666 | 6/1988 |
| EP | 0327978 | 8/1989 |
| EP | 969128 | 1/2000 |
| WO | WO-87/07559 | 12/1987 |
| WO | WO-2007/113127 | 10/2007 |

OTHER PUBLICATIONS

Coffman, et al., "Polymeric Amides from Diamines and Dibasic Acids," *Journal of Polymer Science* (Jun. 1947), vol. 2, Issue 3, pp. 306-311.
U.S. Appl. No. 12/281,789, filed Sep. 5, 2008.
U.S. Appl. No. 12/295,348, filed Sep. 30, 2008.
U.S. Appl. No. 12/298,152, filed Oct. 23, 2008.
U.S. Appl. No. 12/301,782, filed Nov. 21, 2008.
U.S. Appl. No. 12/336,969, filed Dec. 17, 2008.
U.S. Appl. No. 12/673,180, filed Feb. 12, 2010.
U.S. Appl. No. 12/864,176, filed Jul. 22, 2010.
U.S. Appl. No. 12/863,734, filed Sep. 3, 2010.

* cited by examiner

*Primary Examiner* — Kriellion Sanders
(74) *Attorney, Agent, or Firm* — Drinker Biddle & Reath LLP

(57) ABSTRACT

The present relates to nylon-5,10 molding compositions comprising
A) from 40 to 90% by weight of a nylon-5,10,
B) from 10 to 60% by weight of fiber-containing or mineral-containing fillers,
C) from 0 to 20% by weight of further additives,
where the total of the percentages by weight of components A) to C) is 100%.
The present invention moreover relates to a process for the preparation of these molding compositions, to the use of these molding compositions for the production of moldings of any type, and to the resultant moldings, preferably motor vehicle bodywork parts or electronics components of any type, foils, and fibers.

15 Claims, No Drawings

FIBER-REINFORCED POLYAMIDE[5,10] MOLDING COMPOUNDS

CROSS-REFERENCE TO RELATED APPLICATIONS

This application is a national stage application (under 35 U.S.C. §371) of PCT/EP2009/051008, filed Jan. 29, 2009, which claims benefit of European application 08101120.7, filed Jan. 31, 2008.

BACKGROUND OF THE INVENTION

The present invention relates to nylon-5,10 molding compositions comprising
A) from 40 to 90% by weight of a nylon-5,10,
B) from 10 to 60% by weight of fiber-containing or mineral-containing fillers, and
C) from 0 to 20% by weight of further additives,
where the total of the percentages by weight of components A) to C) is 100%.

The present invention moreover relates to a process for the preparation of these molding compositions, to the use of these molding compositions for the production of moldings of any type, and to the resultant moldings, preferably motor vehicle bodywork parts or electronics components of any type, foils, and fibers.

WO 2007/113127 discloses a process for the preparation of pentamethylenediamine and its polycondensation with aliphatic dicarboxylic acids, to give polyamides. There are few disclosures in the literature concerning nylon-5,10. Commercially available fiber-reinforced polyamides, such as nylon-6 or nylon-6,10, often have unsatisfactory surface quality. This defective surface quality is particularly apparent in black-colored polyamides.

BRIEF SUMMARY OF THE INVENTION

A nylon-5,10 molding composition comprising
A) from 40 to 90% by weight of a nylon-5,10,
B) from 10 to 60% by weight of fiber-containing or mineral-containing fillers, and
C) from 0 to 20% by weight of further additives.

It was an object of the present invention to raise the surface quality of fiber-reinforced—particularly black-colored—polyamides, without impairing mechanical properties.

Surprisingly, the inventive nylon-5,10 polyamides exhibit markedly better surface quality than comparable PA[6] and PA[6,10] molding compositions; at the same time, there is likewise an improvement in mechanical properties, such as flowability and shrinkage.

DETAILED DESCRIPTION OF THE INVENTION

The nylon-5,10 polyamides can be prepared as described in WO 2007/113127. The proportion of the nylon-5,10 polyamides (component A) comprised in the inventive molding compositions is from 40 to 90% by weight, preferably from 55 to 88% by weight, and in particular from 60 to 80% by weight.

Fiber-containing fillers B) that may be mentioned are carbon fibers, glass fibers or natural fibers, the amounts used of which are from 10 to 60% by weight, in particular from 15 to 40% by weight, preferably from 20 to 35% by weight.

Preferred fibrous fillers that may be mentioned are glass fibers, carbon fibers, aramid fibers, and potassium titanate fibers, particular preference being given to glass fibers in the form of E glass. These can be used in the form of rovings or in particular in the form of chopped glass in the forms commercially available. The diameter of the fibers is generally from 3 to 30 μm, preferably from 6 to 20 μm, and particularly preferably from 8 to 15 μm. The length of the fibers in the compounded material is generally from 20 μm to 1000 μm, preferably from 180 to 500 μm, and particularly preferably from 200 to 400 μm.

Natural fibers are cellulose fibers, hemp fibers, sisal, or Kenaf.

The fibrous fillers can have been surface-pretreated with a silane compound, to improve compatibility with the thermoplastics.

Suitable silane compounds are those of the general formula

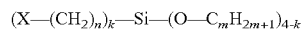

in which the definitions of the substituents are as follows:

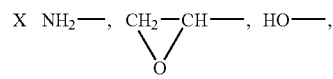

n is a whole number from 2 to 10, preferably from 3 to 4,
m is a whole number from 1 to 5, preferably from 1 to 2,
k is a whole number from 1 to 3, preferably from 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used for surface coating of the silane compounds are from 0.01 to 2% by weight, preferably from 0.025 to 1.0% by weight, and in particular from 0.05 to 0.5% by weight (based on B).

A mineral filler having pronounced acicular character can serve as a suitable mineral-containing filler B. An example that may be mentioned is acicular wollastonite. The L/D (length to diameter) ratio of the mineral is preferably from 8:1 to 35:1, with preference from 8:1 to 11:1. The mineral filler can, if appropriate, have been pretreated with the abovementioned silane compounds; however, the pretreatment is not essential.

Other particulate, mineral fillers B) that may be mentioned are talc, kaolin, calcined kaolin, wollastonite, and chalk, and also lamellar or acicular fillers, their amounts preferably being from 10 to 60% by weight, with preference from 10 to 50% by weight. Those preferred for this purpose are boehmite, bentonite, montmorillonite, vermiculite, hectorite and laponite.

Pigments have proven to be suitable additives C, examples being nigrosine, titanium dioxide, zinc sulfide, ultramarine blue, iron oxide, anthraquinones, quinacridones, phthalocyanines, perylenes, or a mixture of these. Nanoparticulate additives are particularly preferably used.

According to the invention, the component C) added can comprise an electrically conductive additive. It is preferable to use only one electrically conductive additive, but it is also possible, if appropriate, to use two or more electrically conductive additives. Examples of suitable electrically conductive additives are carbon nanotubes, graphite, or carbon black. Use of carbon black is particularly preferred. It not only increases conductivity but also serves for black coloring.

The amount generally added, preferably of carbon black and graphite, is from 0.01 to 20%, preferably from 0.01 to 10% by weight, and particularly preferably from 0.01 to 5% by weight.

For the purposes of the present invention, carbon nanotubes are carbon-containing macromolecules in which the carbon has (mainly) graphite structure and the individual graphite layers have been arranged in the shape of a tube. Nanotubes and their synthesis are known in the literature (for example J. Hu et al., Acc. Chem. Res. 32 (1999), 435-445). In principle, any type of nanotube can be used for the purposes of the present invention.

The diameter of the individual tubular graphite layers (graphite tubes) is preferably from 4 to 12 nm, in particular from 5 to 10 nm. Nanotubes can in principle be divided into what are known as single-walled nanotubes (SWNTs) and multi-walled nanotubes (MWNTs). There is therefore a plurality of overlapping graphite tubes in the MWNTs.

The external shape of the tubes can moreover vary, and they can have uniform diameters internally and externally, but it is also possible to produce tubes in the shape of a knot and to produce vermicular structures.

The aspect ratio (length of a particular graphite tube with respect to its diameter) is at least >10, preferably >5. The length of the nanotubes is at least 10 nm. For the purposes of the present invention, MWNTs are preferred as component E). The aspect ratio of the MWNTs is in particular about 1000:1, their average length in particular being about 10 000 nm.

The specific BET surface area is generally from 50 to 2000 $m^2/g$, preferably from 200 to 1200 $m^2/g$. The amount of impurities produced in the catalytic production process (e.g. metal oxides) is generally from 0.1 to 12%, preferably from 0.2 to 10%, as shown by HRTEM.

Suitable "multi-wall" nanotubes can be purchased from Hyperion Catalysis Int., Cambridge Mass. (USA) (see also EP 205 556, EP 969 128, EP 270 666, U.S. Pat. No. 6,844,061).

The conductive carbon black used can be in any of the familiar forms of carbon black, an example of a suitable material being the commercially available product Ketjenblack 300 from Akzo.

Conductive carbon black can also be used to achieve conductivity modification. Carbon black conducts electrons (F. Camona, Ann. Chim. Fr. 13, 395 (1988)) by virtue of graphitic layers embedded in amorphous carbon. Electricity is conducted within the aggregates composed of carbon black particles and between the aggregates if the distances between the aggregates are sufficiently small. In order to achieve conductivity by minimizing the amount added, it is preferable to use carbon blacks having an anisotropic structure (G. Wehner, Advances in Plastics Technology, APT 2005, Paper 11, Katowice 2005). In these carbon blacks, the primary particles associate to give anisotropic structures, the result being that the necessary distances between the carbon black particles for achievement of conductivity are achieved in compounded materials, even at comparatively low loading (C. Van Bellingen, N. Probst, E. Grivei, Advances in Plastics Technology, APT 2005, Paper 13, Katowice 2005).

The oil absorption (measured to ASTM D2414-01) of suitable grades of carbon black is by way of example at least 60 ml/100 g, preferably more than 90 ml/100 g. The BET surface area of suitable products is more than 50 $m^2/g$, preferably more than 60 $m^2/g$ (measured to ASTM D3037-89). There can be various functional groups located on the surface of the carbon black. The carbon blacks can be prepared by various processes (G. Wehner, Advances in Plastics Technology, APT 2005, Paper 11, Katowice 2005).

The conductivity additive used can also comprise graphite. Graphite is a form of carbon as described by way of example in A. F. Hollemann, E. Wieberg, N. Wieberg, "Lehrbuch der anorganischen Chemie" [Textbook of inorganic chemistry], 91st-100th edition, pp. 701-702. Graphite is composed of planar carbon layers arranged one on top of the other. Graphite can be comminuted by grinding. The particle size is in the range from 0.01 μm to 1 mm, preferably in the range from 1 to 250 μm.

Other components C) that can be used are other additives, such as stabilizers, oxidation retardants, flame retardants, agents to counteract decomposition by heat and decomposition by ultraviolet light, lubricants and mold-release agents, colorants, such as dyes, plasticizers, impact modifiers, etc.

Examples of flame retardants are red phosphorus, magnesium hydroxide, and melamine cyanurate, the concentration generally used of these being from 1 to 20% by weight, preferably from 3 to 15% by weight, and particularly preferably from 5 to 10% by weight. Magnesium hydroxide may also be used at higher concentrations up to 70% by weight. Red phosphorus may be used in the form of a masterbatch or as a powder.

The stabilizers can be added to the nylon-5,10 molding compositions at any stage of the preparation process, but are preferably added as early as possible, otherwise decomposition can begin before the stabilizer has been incorporated.

Examples of oxidation retardants and heat stabilizers are halides of metals of group I of the Periodic Table of the Elements, e.g. sodium halides, potassium halides, and/or lithium halides, if appropriate in combination with copper(I) halides, e.g. chlorides, bromides, or iodides, and sterically hindered phenols, hydroquinones, various substituted representatives of these groups, and mixtures of these, in concentrations up to 1% by weight, based on the weight of the thermoplastic molding compositions.

UV stabilizers that may be mentioned are various substituted resorcinols, salicylates, benzotriazoles, and benzophenones, the amounts generally used of which are up to 2% by weight, based on the molding composition.

The amounts generally used of lubricants and mold-release agents are at most 1% by weight, based on the total weight of the molding composition. Examples of these are stearic acid, steryl alcohol, stearamides, and calcium stearates.

The content of component C) in the inventive molding compositions, in terms of fillers, is from 0 to 20% by weight, preferably from 1 to 15% by weight, particularly preferably from 1.5 to 10% by weight, based on the total weight of the molding composition. The content of component C) in the inventive molding compositions in terms of stabilizer and lubricant is from 0 to 10% by weight, preferably from 0.05 to 2% by weight, and particularly preferably from 0.08 to 1% by weight.

The inventive nylon-5,10 molding compositions can preferably be prepared in a two-stage process (steps i) to ii):
i) polycondensing 1,5-pentamethylenediamine, prepared via fermentation using *Corynebacterium glutamicum*, and sebacic acid, which can by way of example be prepared as described in U.S. Pat. No. 2,217,515; and
ii) compounding the resultant nylon-5,10 in an extruder with from 10 to 60% by weight of fiber-containing or mineral-containing filler.

Nylon-5,10 can be prepared via polycondensation of 1,5-pentamethylenediamine and sebacic acid in a molar ratio of from 0.95:1.05 to 1.05:0.95, by known methods. The condensation can take place either batchwise in a batch process or else continuously. In the case of batchwise preparation of the polyamides, by way of example, an aqueous solution of the monomers is used as initial charge in an autoclave and is heated, generally to from 200 to 300° C. A pressure of from 10 to 50 bar, or preferably from 15 to 30 bar, becomes established here and can be kept constant via depressurization through removal of excess water vapor, for up to 4 hours. The heating phase (up to the desired reaction temperature) usually takes from 0.5 to 3 hours. The continued stirring time during which the reaction mixture is kept at from 240 to 300° C. is generally from 1 to 5 hours. The mixture is then depressurized to atmospheric pressure during a period of from 0.5 to 3 hours. The material discharged from the autoclave is by way of example pelletized in a water bath. The continuous procedure can be carried out by analogy with EP 129195 or 129196.

The inventive molding compositions can be prepared by processes known per se, via mixing of the components nylon-5,10, A) and, if appropriate, B) and C) in the melt at elevated temperatures, or else via mixing of the components in mixing apparatuses. It is advantageous to use extruders for this, e.g. single-screw or twin-screw extruders, or else to use other conventional plastifying apparatuses, such as Brabender mixers or Banbury mixers. The extrudate can be cooled and comminuted. It is also possible to premix individual components and then to add the remaining starting materials individually and/or likewise in mixed form. The mixing temperatures are generally from 230 to 320° C.

The molar mass (Mn) of the nylon-5,10 polyamides is preferably in the range from 1000 to 100 000, in particular in the range from 9000 to 75 000 and particularly preferably in the range from 10 000 to 50 000 g/mol.

Features of the inventive molding compositions are good notched impact resistance, and heat resistance values (HDT B). In comparison with conventional polyamides, improvements are made in flowability (MVR), surface gloss (gloss determined to DIN 67530 on plaques [60×60×2 mm]), and shrinkage (determined to ISO 294-4 EN on plaques [60×60×2 mm]).

The surface gloss was determined to DIN 67530 on plaques [60×60×2 mm]. The average gloss (60°) of the inventive molding compositions is generally from 30 to 105, and preferably from 40 to 100, based on a polished, black glass surface.

Shrinkage was determined to ISO 294-4 EN on plaques [60×60×2 mm; 500 bar]. The shrinkage of the inventive molding compositions is generally from 0.2 to 1.0%, and preferably from 0.2 to 0.8%.

The materials are suitable for the production of fibers, foils, and moldings of any type. Some examples will now be mentioned: cylinder head covers, motorcycle covers, intake manifolds, charge-air cooler caps, plug connectors, gearwheels, fan wheels, cooling-water tanks.

Possible uses in automobile interiors are for dashboards, steering-column switches, seat components, headrests, center consoles, gearbox components, and door modules, and possible uses in automobile exteriors are for door handles, exterior-mirror components, windshield-wiper components, windshield-wiper protective housings, decorative grilles, roof rails, sunroof frames, engine covers, cylinder-head covers, intake manifolds, windshield wipers, and also exterior bodywork parts such as wheel surrounds, door cladding, tailgates, spoilers, side parts, roof modules, and engine hoods.

The inventive molding compositions are suitable for the production of spectacle frames and for the production of electronics components, examples being mobile-telephone casings, laptop components, display-screen frames, navigator-screen frames, pocket-computer components, etc.

EXAMPLES

Characterization of Molding Compositions

The molecular weight Mn of the polymers was determined as follows: 15 mg of the polymers were dissolved in 10 ml of hexafluoroisopropanol (HFIP). 125 µl of each of these solutions were analyzed by gel permeation chromatography (GPC). The measurements were made at room temperature. The eluent used comprised HFIP+0.05% by weight of potassium trifluoroacetate. The elution rate was 0.5 ml/min. The following column combination was used here (a producer of all of the columns being Showa Denko Ltd., Japan): Shodex® HFIP-800P (diameter 8 mm, length 5 cm), Shodex® HFIP-803 (diameter 8 mm, length 30 cm), Shodex® HFIP-803 (diameter 8 mm, length 30 cm). The polymers were detected by means of an RI detector (differential refractometry). Narrowly distributed polymethyl methacrylate standards with molecular weights of from Mn=505 to Mn=2 740 000 were used for calibration. Extrapolation was used for determination in the case of elution ranges outside this range.

The intrinsic viscosity of the polyamides was measured to EN ISO 1628-1, on 0.5% strength by weight solutions in 96% strength by weight sulfuric acid. The VN of the polymers is generally from 10 to 400 ml/g, preferably from 30 to 300 ml/g, and particularly preferably from 50 to 250 ml/g.

MVR was measured (275° C., 5 kg load) to ISO 1133. The MVR of the inventive polyamides is from 5 to 500 ml/10 min, preferably from 10 to 400 ml/10 min, particularly preferably from 20 to 300 ml/10 min.

The intrinsic viscosity of the polyamides was measured to EN-ISO1628-1, on 0.5% strength by weight solutions in 96% strength by weight sulfuric acid. The intrinsic viscosity of PA [5.10]+30% GF (inventive example 1) is 151 ml/g.

Surface gloss was determined to DIN 67530 on plaques [60×60×2 mm]. The value stated in table 1 is based on a polished, black glass surface (100).

Shrinkage was determined to ISO 294-4 EN on plaques [60×60×2 mm; 500 bar]. The value stated in table 1 is in % with respect to the length.

Preparation of 1,5-Pentamethylenediamine 1,5-Pentamethylenediamine was prepared via fermentation using *Corynebacterium glutamicum* (see WO 2007/113127).

Preparation of Polyamides

Nylon-5,10 [Precursor 1]

12.5 kg of aqueous 48.19% strength pentamethylenediamine solution, 12.2 kg of sebacic acid, and 6.59 kg of distilled water was used as initial charge in a stirred tank. The reaction mixture was thoroughly flushed 10 times with nitrogen, and heated to 200° C. This temperature of the reaction vessel was kept constant for 1 hour, at 17 bar. The pressure was then reduced to atmospheric pressure, and the reaction mixture was heated to 270° C. The polymerization reaction was continued at this temperature for 70 min, under nitrogen. The VN (intrinsic viscosity) of the resultant polymer is 152 ml/g to EN ISO 1628-1.

Nylon-6,10 [Precursor 2]

10.11 g of aqueous 69.0% strength hexamethylenediamine solution, 12.20 kg of sebacic acid, and 16.04 kg of distilled water were placed in a stirred tank. The reaction mixture was thoroughly flushed 10 times with nitrogen and heated to 200° C. The pressure was kept constant at this temperature at 17 bar, for 1 hour. The reaction vessel was then depressurized to atmospheric pressure, and the reaction mixture was heated to 270° C. The VN (intrinsic viscosity) of the resultant polymer is 153 ml/g to EN ISO 1628-1.

Nylon-6 [Precursor 3]

Ultramid® B3 from BASF SE was used (VN 149 ml/g).

Inventive Example 1

A stream of 14 kg/h of nylon-5,10 (precursor 1) and a stream of 6 kg/h of glass fiber from OCF (OCF1110DS, diameter 10 μm) were compounded at 260° C. at 20 kg/h throughput in a ZSK40 twin-screw extruder. The screw rotation rate was 200 rpm. After pelletization, the product was dried for 16 h at 80° C.

Comparative Example 2

A stream of 14 kg/h of nylon-6,10 (precursor 2) and a stream of 6 kg/h of glass fiber from OCF (OCF1110DS, diameter 10 μm) were compounded at 260° C. at 20 kg/h throughput in a ZSK40 twin-screw extruder. The screw rotation rate was 200 rpm. After pelletization, the product was dried for 16 h at 80° C.

Comparative Example 3

A stream of 14 kg/h of nylon-6 (precursor 3) and a stream of 6 kg/h of glass fiber from OCF (OCF1110DS, diameter 10 μm) were compounded at 260° C. at 20 kg/h throughput in a ZSK40 twin-screw extruder. The screw rotation rate was 200 rpm. After pelletization, the product was dried for 16 h at 80° C.

A comparison was made in table 1 between the results of inventive example 1 and of comparative examples 2 and 3, and between precursors 1 to 3.

TABLE 1

|  | Inventive example 1 | Comp. ex. 2 | Comp. ex. 3 |
|---|---|---|---|
| Gloss (60°)* | 62 | 30 | 35 |
| MVR (ml/10 min) | 62 | 51 | 48 |
| Intrinsic viscosity (ml/g) | 151 | 148 | 150 |
| Shrinkage (%), length | 0.67 | 0.93 | 0.83 |
|  | Precursor 1 | Precursor 2 | Precursor 3 |
| Gloss (60°)* | 101 | 102 | 101 |
| MVR (ml/10 min) | 175 | 172 | 170 |
| Intrinsic viscosity (ml/g) | 152 | 153 | 149 |

TABLE 2

Further mechanical properties of PA[5,10] + 30% glass fibers; inventive example 1)

|  | Inventive example 1 |
|---|---|
| Proportion of renewable raw materials | 100% |
| ISO 179/1eU (RT) | 86 kJ/m$^2$ |
| ISO 179/1eU (−30° C.) | 82 kJ/m$^2$ |
| ISO 179/1eA (RT) | 12 kJ/m$^2$ |
| ISO 179/1eA (−30° C.) | 8 kJ/m$^2$ |
| modulus of elasticity [ISO 527-2] | 8310 MPa |
| tensile strength [ISO 527-2] | 155 MPa |
| tensile strain [ISO 527-2] | 3.9% |
| HDT A [ISO 75-2] | 186° C. |
| HDT B [ISO 75-2] | 208° C. |

Melting point measured by DSC (DIN EN ISO 11357): 215° C.

The invention claimed is:

1. A nylon-5,10 molding composition comprising
   A) from 40 to 90% by weight of a nylon-5,10,
   B) from 15 to 40% by weight of glass fibers, and
   C) from 0 to 20% by weight of further additives,
   where the total of the percentages by weight of components A) to C) is no greater than 100%.

2. The nylon-5,10 molding composition according to claim 1, wherein component B) is chopped glass fiber or rovings.

3. The nylon-5,10 molding composition according to claim 1, wherein component C) is a flame retardant.

4. The nylon-5,10 molding composition according to claim 1, wherein component C) is red phosphorus, magnesium hydroxide, or melamine cyanurate.

5. The nylon-5,10 molding composition according to claim 1, wherein component C) is a particulate filler.

6. The nylon-5,10 molding composition according to claim 1, wherein component C) is carbon black, graphite, carbon nanotube, nigrosine, titanium dioxide, zinc sulfide, ultramarine blue, iron oxide, anthraquinone, quinacridone, phthalocyanine, perylene, or a mixture of thereof.

7. The nylon-5,10 molding composition according to claim 1, wherein component C) is from 0.01 to 5% by weight of carbon black.

8. A process for the preparation of the nylon-5,10 molding composition according to claim 1, which comprises
   i) polycondensing, 1,5-pentamethylenediamine, prepared via fermentation using *Corynebacterium glutamicum*, and sebacic acid; and
   compounding the resultant nylon-5,10 in an extruder with from 15 to 40% by weight of glass fibers.

9. A fiber, a foil, or a molding, obtained from the nylon-5,10 molding composition according to claim 1.

10. A nylon-5,10 molding composition consisting of
    A) from 40 to 90% by weight of a nylon-5,10,
    B) from 15 to 40% by weight of glass fibers, and
    C) from 0 to 20% by weight of further additives,
    where the total of the percentages by weight of components A) to C) is 100%.

11. The nylon-5,10 molding composition according to claim 10, wherein component B) is chopped glass fiber or rovings.

12. The nylon-5,10 molding composition according to claim 10, wherein component C) is red phosphorus, magnesium hydroxide, or melamine cyanurate.

13. The nylon-5,10 molding composition according to claim 10, wherein component C) is carbon black, graphite, carbon nanotube, nigrosine, titanium dioxide, zinc sulfide, ultramarine blue, iron oxide, anthraquinone, quinacridone, phthalocyanine, perylene, or a mixture of thereof.

14. The nylon-5,10 molding composition according to claim 10, wherein component C) is from 0.01 to 5% by weight of carbon black.

15. A fiber, a foil, or a molding, obtainable from the nylon-5,10 molding composition according to claim 10.

* * * * *